United States Patent
Choo et al.

(10) Patent No.: US 9,966,589 B2
(45) Date of Patent: May 8, 2018

(54) FASTENING APPARATUS FOR BATTERY TERMINAL CASE

(71) Applicants: HYUNDAI MOTOR COMPANY, Seoul (KR); YURA CORPORATION CO., LTD. of (Sampyeong-dong), Seongnam-si, Gyeonggi-do (KR); KIA MOTORS CORPORATION, Seoul (KR)

(72) Inventors: Sung Kwan Choo, Hwaseong-si (KR); Joon Ho Lee, Hwaseong-si (KR); Jung Nan Ryu, Seoul (KR); Geon Gu Kang, Hwaseong-si (KR); Gil Woo Jung, Suwon-si (KR); Kwang-Ho Song, Gunpo-si (KR)

(73) Assignees: HYUNDAI MOTOR COMPANY, Seoul (KR); YURA CORPORATION CO., LTD., Seongnam-si, Gyeonggi-do (KR); KIA MOTORS CORPORATION, Seoul (KR)

( * ) Notice: Subject to any disclaimer, the term of this patent is extended or adjusted under 35 U.S.C. 154(b) by 527 days.

(21) Appl. No.: 14/556,079

(22) Filed: Nov. 28, 2014

(65) Prior Publication Data

US 2015/0303438 A1    Oct. 22, 2015

(30) Foreign Application Priority Data

Apr. 21, 2014  (KR) .................. 10-2014-0047534

(51) Int. Cl.
*H01M 2/30*  (2006.01)
*H01M 2/10*  (2006.01)

(52) U.S. Cl.
CPC ......... *H01M 2/305* (2013.01); *H01M 2/1083* (2013.01); *H01M 2220/20* (2013.01)

(58) Field of Classification Search
CPC .................................................. H01M 2/1083
USPC ........................... 16/319, 343, 346, 347, 374
See application file for complete search history.

(56) References Cited

U.S. PATENT DOCUMENTS

| | | | | |
|---|---|---|---|---|
| 5,902,695 A | * | 5/1999 | Siedlik | H01M 2/32 |
| | | | | 429/181 |
| 2015/0284980 A1 | * | 10/2015 | McCullough | A47B 3/08 |
| | | | | 297/16.1 |

FOREIGN PATENT DOCUMENTS

| | | |
|---|---|---|
| JP | 2002-141056 A | 5/2002 |
| JP | 3489719 B2 | 1/2004 |
| JP | 2006-294474 A | 10/2006 |
| JP | 2010-083164 A | 4/2010 |
| KR | 20-2009-0006548 U | 7/2009 |
| KR | 2013-0039572 A | 4/2013 |
| KR | 10-1314106 B1 | 10/2013 |

\* cited by examiner

*Primary Examiner* — Stephan Essex
(74) *Attorney, Agent, or Firm* — McDermott Will & Emery LLP

(57) ABSTRACT

A fastening apparatus for a battery terminal case includes a main body having open upper and side portions configured to hold a battery terminal therein, a side body coupled to the open side portion of the main body, and an upper cover, hingedly coupled to the side body, provided at the open upper portion of the main body. Hinge protrusions are formed on opposing sides of one of the side body and the upper cover. Hinge holes are formed on opposing sides of the other one of the side body and the upper cover. The hinge holes are configured to receive the hinge protrusions therein.

6 Claims, 6 Drawing Sheets

FASTENING APPARATUS FOR BATTERY TERMINAL CASE

CROSS-REFERENCE TO RELATED APPLICATION

This application claims priority to and the benefit of Korean Patent Application No. 10-2014-0047534 filed in the Korean Intellectual Property Office on Apr. 21, 2014, the entire contents of which are incorporated herein by reference.

TECHNICAL FIELD

The present inventive concept relates to a fastening apparatus for a battery terminal case. More particularly, the present inventive concept relates to a fastening apparatus for a battery terminal case of a structure which can decrease the size of a battery terminal case mounted to a vehicle, improve a fastening performance, enable appropriate adjustment of an opening angle of an upper cover, and enlarge an opening of the upper cover.

BACKGROUND

In general, in order to protect the battery terminal, the fastening apparatus is provided to the battery terminal case.

FIGS. 1A and 1B illustrate drawings showing a configuration of a related art fastening apparatus for a battery terminal case. FIG. 1A illustrates a plan view of the related art fastening apparatus for a battery terminal case, and FIG. 1B illustrates a side view of an 'A' part in FIG. 1A.

Referring to FIGS. 1A and 1B, the related art fastening apparatus for a battery terminal case is provided with a main body 10, a side body, and an upper cover which construe a housing for protecting the battery terminal.

The main body 10 has a hexahedral shape having opened upper portion and side portion, substantially. The opened sides of the main body 10 has a side body 20 provided thereto, and the opened upper portion of the main body 10 has an upper cover 30 provided thereto.

The side body 20 and the upper cover 30 are coupled with a hinge at sides thereof, and the other side of the side body 20 and the main body 10 are fastened with a fastening device.

And, the battery terminal for the vehicle is placed in a space constructed of the main body 10, the side body 20 and the upper cover 30.

However, since the related art battery terminal case has a hinge 31 provided between the upper cover 30 and the main body 10 protruded from the housing to an outside thereof, the related art battery terminal case has a problem in that the hinge 31 increases an entire volume of the fastening apparatus for the battery terminal case.

And, the increased entire volume of the fastening apparatus for a battery terminal case makes a freedom of arrangement of various components in an engine room of the vehicle poor.

And, the related art fastening apparatus for a battery terminal case has a problem in that, since a load occurred at the time the upper cover 30 is being opened is not applied to the hinge 31 uniformly, opening of the upper cover 30 is difficult.

Moreover, since the hinge 31 provided between the upper cover 30 and the main body 10 is protruded outwardly, an extra component is required to be provided for reinforcing stiffness of the hinge 31. Consequently, a problem takes place in that an entire mold development cost increases.

The above information disclosed in this Background section is only for enhancement of understanding of the background of the inventive concept and therefore it may contain information that does not form the prior art that is already known in this country to a person of ordinary skill in the art.

SUMMARY

The present disclosure has been made in an effort to provide a fastening apparatus for a battery terminal case having advantages of decreasing the volume of a fastening apparatus for a battery terminal case provided to a vehicle, making opening of the upper cover easy, and making adjustment of an opening and an opened angle of the upper cover of the battery terminal case easy An object of the present inventive concept for solving the problems is to provide a fastening apparatus for a battery terminal case, which can decreasing the volume of a fastening apparatus for a battery terminal case provided to a vehicle.

Another object of the present inventive concept is to provide a fastening apparatus for a battery terminal case, which can have uniform distribution of a load occurred at the time of opening the fastening apparatus, to make opening of the upper cover easy.

Another object of the present inventive concept is to provide a fastening apparatus for a battery terminal case, which can make adjustment of an opening and an opened angle of the upper cover of the battery terminal case easy.

To achieve the objects of the present inventive concept, a fastening apparatus for a battery terminal case may include a main body having open upper and side portions for providing a battery terminal therein, a side body coupled to the open side portion of the main body, and an upper cover provided to the open upper portion of the main body hinge coupled to the side body, wherein hinge protrusions may be formed on opposing sides of one of the side body and the upper cover, and hinge holes may be formed on opposing sides of the other one of the side. The hinge holes may be configured to receive the hinge protrusions therein.

In certain embodiments, each hinge protrusion may have a stopper protrusion extended from it. Each hinge hole may have a stopper hole configured to receive the stopper protrusion. An angle adjusting rib may further be formed on the upper cover or the side body. The angle adjusting rib may be configured to adjust, with the stopper protrusion, an opening angle of the upper cover.

In certain embodiments, the upper cover or the side body may have recessed seating surfaces formed in opposing sides thereof. The hinge hole and the stopper hole may be formed in each of the seating surfaces.

In certain embodiments, the fastening apparatus may further include a locking device configured to secure the upper cover to the main body.

In certain embodiments, the locking device may include a hook rotatably provided to one of the upper cover and the main body, and a hook protrusion formed on the other one of the main body and the upper cover for latching the hook.

In another embodiment of the present inventive concept, a fastening apparatus for a battery terminal case may include a main body having an open upper portion and side portion configured to hold a battery terminal therein, a side body coupled to the open side portion of the main body, and an upper cover provided to the open upper portion of the main body hinge coupled to the main body, wherein hinge protrusions may be formed on opposing sides of one of the main body and the upper cover and hinge holes may be formed in opposing sides of the other one of the main body and the upper cover. The hinge holes may be configured to receive the hinge protrusions therein.

In certain embodiments, each hinge protrusion may have a stopper protrusion, and each hinge hole may have a stopper hole configured to receive the stopper protrusion. An angle adjusting rib may further be formed on the upper cover or the main body for adjusting, with the stopper protrusion, an opening angle of the upper cover.

In certain embodiments, the upper cover or the main body may have recessed seating surfaces formed in opposing sides thereof. The hinge holes and the stopper holes may be formed in the seating surfaces.

In certain embodiments, the fastening apparatus may further include a locking device configured to secure the upper cover to the side body.

In certain embodiments, the locking device may include a hook rotatably provided to one of the upper cover and the side body, and a hook protrusion formed on the other one of the side body and the upper cover for latching the hook.

Thus, the fastening apparatus for a battery terminal case in accordance with an exemplary embodiment of the present inventive concept has the following advantages. The formation of the hinge protrusions on opposing sides of the upper cover provides an effect of enabling to distribute the load occurred at the time of opening the upper cover to the hinge protrusions formed on opposing sides the upper cover, uniformly.

And, the angle adjusting protrusion formed on the upper cover and the stopper protrusion formed on the side body provides effects of enabling to appropriate adjustment of an opening angle of the upper cover and to make an opening large.

And, the fastening apparatus provided to both of the upper cover and the side body for opening/closing the upper cover enables to reduce the entire volume of the battery terminal case.

And, the removal of the rib provided separately for reinforcing stiffness of the hinge which opens/closes the upper cover provides an effect of saving a mold development cost.

BRIEF DESCRIPTION OF THE DRAWINGS

The attached drawings illustrate exemplary modes of the present inventive concept, provided for describing the present inventive concept in more detail, but not for limiting technical aspects of the present inventive concept.

DETAILED DESCRIPTION OF THE EMBODIMENTS

The present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

Parts not relevant to the present inventive concept will be omitted for describing the present inventive concept clearly, and throughout the specification, identical or similar parts will be given the same reference numbers.

And, since sizes and thicknesses of elements are shown at will for convenience of description, the present inventive concept is not limited to the drawings without fail, but the thicknesses are enlarged for expressing different parts and regions, clearly.

Figure 1A:
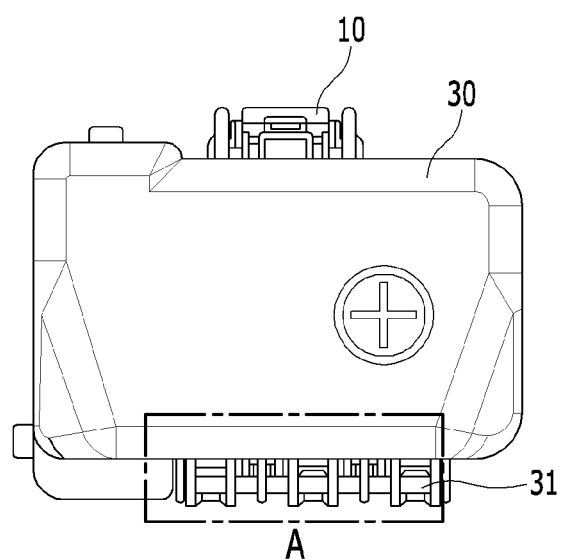
FIGS. 1A and 1B illustrates a configuration of a related art fastening apparatus for a battery terminal case.
Figure 1B:
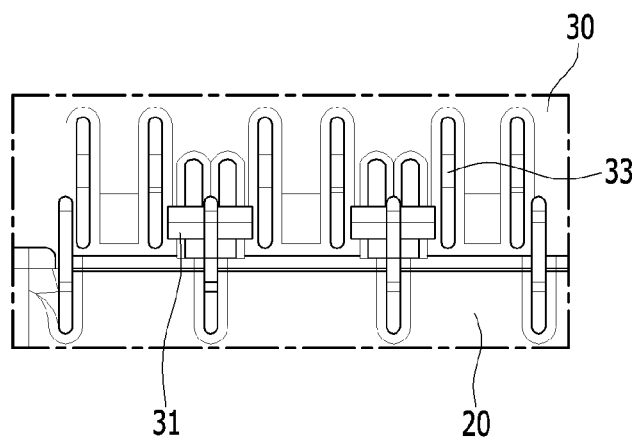
Figure 2:
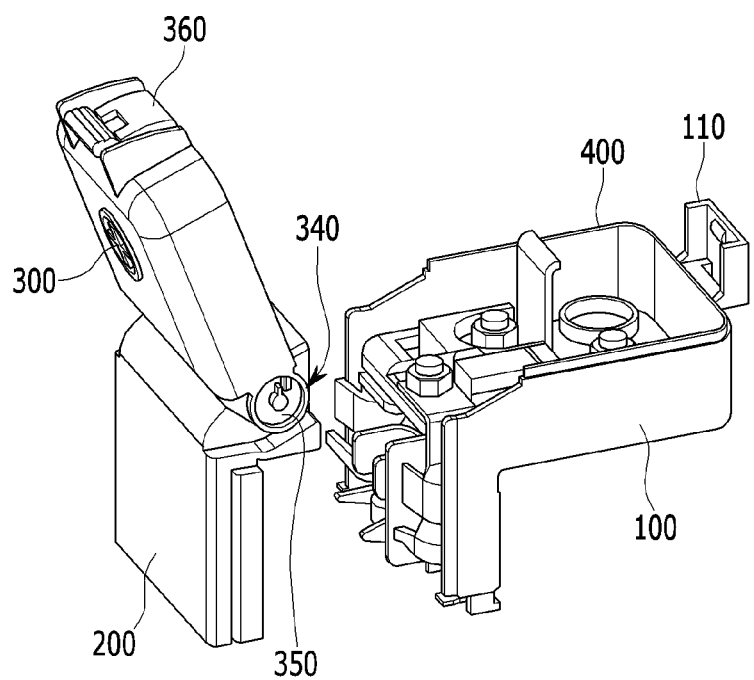
FIG. 2 is an exploded perspective view of a fastening apparatus for a battery terminal case in accordance with an exemplary embodiment of the present inventive concept.
Figure 3:
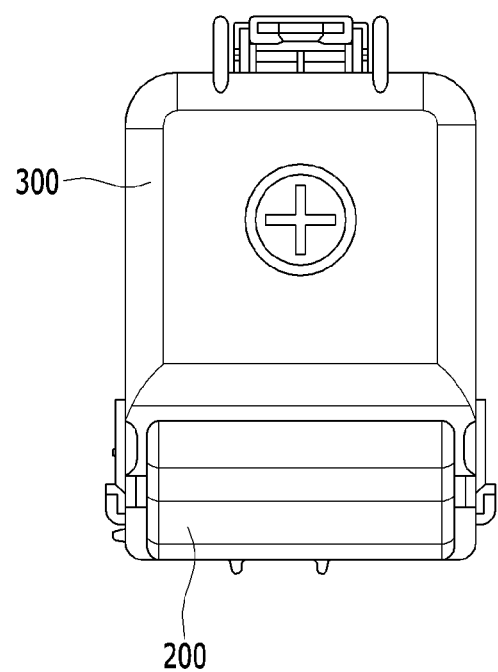
FIG. 3 is a top plan view of a fastening apparatus for a battery terminal case in accordance with an exemplary embodiment of the present inventive concept.
Figure 4:
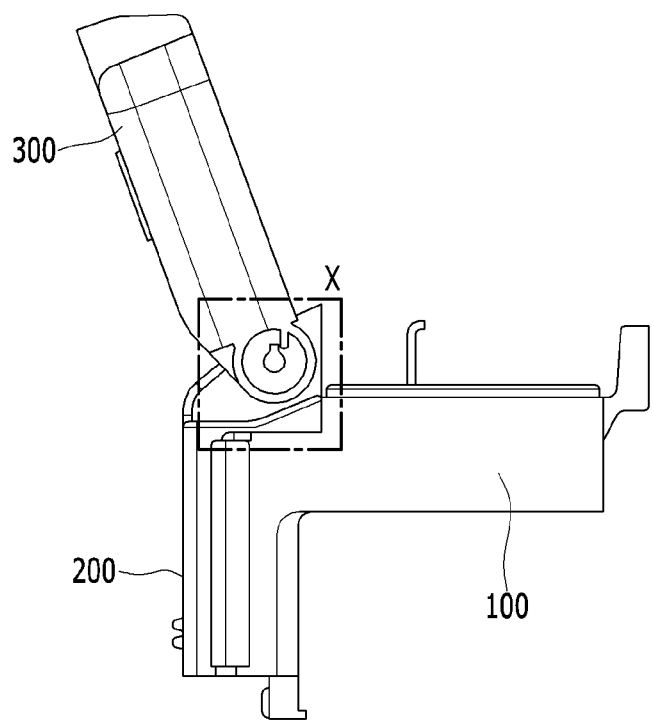
FIG. 4 is a side view of a fastening apparatus for a battery terminal case in accordance with an exemplary embodiment of the present inventive concept.
Figures 5A, 5B:
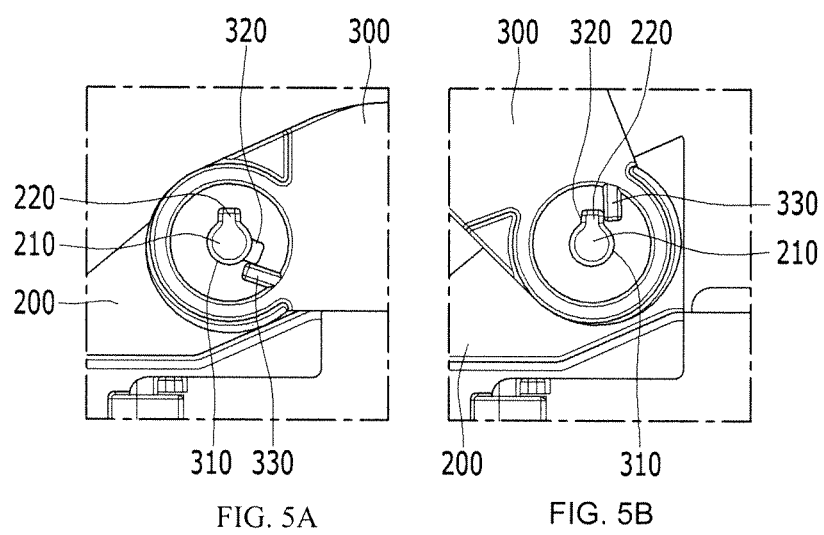
FIG. 5A is an enlarged view of an 'X' part in FIG. 4 when an upper cover is closed.
FIG. 5B is an enlarged view of an 'X' part in FIG. 4 when the upper cover is opened.

FIG. 2 is an exploded perspective view of a fastening apparatus for a battery terminal case in accordance with an exemplary embodiment of the present inventive concept. FIG. 3 is a top plan view of a fastening apparatus for a battery terminal case in accordance with an exemplary embodiment of the present inventive concept. FIG. 4 is a side view of a fastening apparatus for a battery terminal case in accordance with an exemplary embodiment of the present inventive concept. FIG. 5A is an enlarged view of an 'X' part in FIG. 4 when an upper cover is closed, and FIG. 5B is an enlarged view of an 'X' part in FIG. 4 when the upper cover is opened.

Referring to FIGS. 2 to 5B, an embodiment of the fastening apparatus for a battery terminal case includes a main body 100 having an open upper portion and side portion, a side body 200 coupled to the open side portion of the main body 100, and an upper cover 300 provided to the opened upper portion of the main body 100 coupled to the side body 200 with a hinge. The term "upper" is used as a convenient reference. However, the inventive concept includes similar structures oriented in any direction. In another embodiment (not shown), the upper cover is coupled to the main body with a hinge. These embodiments are both described hereinbelow.

A housing space constructed of the main body 100 and the side body 200 has a battery terminal 400 for a vehicle mounted therein.

In one embodiment, the upper cover 300 has one side coupled to the side body 200 with a hinge, and there is a locking device provided between the other side of the upper cover 300 and the main body 100.

The locking device includes a hook 360 rotatably provided to the upper cover 300 and a hook protrusion 110 formed on the main body 100. The hook 360 is formed to be rotatable by elastic force. Upon closing the upper cover 300, the hook 360 is latched at the hook protrusion 110.

in an embodiment, the side body 200 may have circular hinge protrusions 210 protruded outwardly from opposing sides thereof in a lateral direction (See FIG. 2). In certain embodiments, formed on an upper portion of the hinge protrusion 210, there may be a stopper protrusion 220 protruded outwardly in the lateral direction (See FIG. 2). In this case, it is preferable that the hinge protrusion 210 and the stopper protrusion 220 are formed as one unit.

There may be coupling portions 340 which are substantially circular formed on opposing sides upper cover 300, with a circular seating surface 350 formed recessed from each of the coupling portions 340 in the lateral direction (See FIG. 2). In another embodiment, the coupling portions 340 and the seating surfaces 350 may be formed on opposing sides of the side body. In still another embodiment, the coupling portions 340 and the seating surfaces 350 may be formed on opposing sides of the main body. Formed in the seating surface 350, there are a hinge hole 310 matched to the hinge protrusion 210 and a stopper hole 320 matched to the stopper protrusion 220. In this case, it is preferable that the hinge hole 310 and the stopper hole 320 are formed as one unit.

Moreover, the seating surface 350 of the upper cover 300 may have an angle adjusting rib 330 formed thereon for adjusting an opening angle of the upper cover 300. At the time the upper cover 300 is opened, the angle adjusting rib 330 is brought into contact with the stopper protrusion 220, for preventing the upper cover 300 from opening any more. In other embodiments, the angle adjusting rib 330 may be formed on a portion of the side body 200 or the main body 100.

That is, upon adjusting a position of the angle adjusting rib 330 appropriately, it is possible to adjust the opening angle of the upper cover 300 by using the stopper protrusion 220 of the side body 200 and the angle adjusting rib 330 of the upper cover 300. In other embodiments the stopper protrusion 220 may be disposed on the main body 100 or the upper cover 300, and the angle adjusting rib 330 may be disposed on the side body 200 or the main body 100. And, owing to the hinge hole 310 and the stopper hole 320 formed in the recessed seating surface 350 formed in opposing sides of the upper cover 300 and the hinge protrusion 210 and the stopper protrusion 220 respectively inserted in the hinge hole 310 and the stopper hole 320 enable to make the entire volume of the fastening apparatus for a battery terminal case in accordance with an exemplary embodiment of the present inventive concept to be the smallest.

Hereinafter, a method for coupling the fastening apparatus for a battery terminal case and a method for opening the upper cover 300 of a battery terminal case in accordance with an exemplary embodiment of the present inventive concept will be described with reference to the attached drawings.

At first, the coupling portions 340 of the upper cover 300 are moved outwardly in left/right directions such that the coupling portions 340 do not interfere with the hinge protrusions 210, respectively. Then, the hinge hole 310 and the stopper hole 320 formed in the seating surface 350 of the upper cover 300 are inserted in the hinge protrusion 210 and the stopper protrusion 220 on the side body 200, respectively. Finally, upon latching the hook 360 of the upper cover 300 at the hook protrusion 110, the upper cover 300 is fastened to the main body 100.

In order to open the upper cover 300, the hook 360 on the upper cover 300 is turned to decouple the hook 360 from the hook protrusion 110. Then, the upper cover 300 is turned in a circular direction, to open the upper cover 300.

In this time, if the angle adjusting rib 330 touches the stopper protrusion 220, the upper cover 300 is turned no more. That is, if the position of the angle adjusting rib 330 is adjusted appropriately, the opening angle of the upper cover 300 may be adjusted to an angle a designer desires.

Thus, since the fastening apparatus is provided to both sides of the upper cover 300 and both sides of the side body 200 for opening or closing the upper cover 300, the load occurred when the upper cover 300 is being opened or closed are distributed to both sides of the fastening apparatus, uniformly. Eventually, the upper cover 300 may be opened or closed, smoothly.

Moreover, since the fastening apparatus is not protruded from the battery terminal case to an outside thereof, an entire volume of the battery terminal case can be reduced.

In an exemplary embodiment of the present inventive concept, a configuration has been described, in which the hinge protrusion 210 and the stopper protrusion 220 are formed on the side body 200 and the hinge hole 310 and the stopper hole 320 are formed in the upper cover 300. However, the present inventive concept is not limited to this without fail, but it is apparent that it may also be possible to form the hinge protrusion 210 and the stopper protrusion 220 on the upper cover 300 and the hinge hole 310 and the stopper hole 320 are formed in the side body 200. Furthermore, in an exemplary embodiment of the present inventive concept, hinge coupling of the upper cover 300 to the side body 200 has been described. However, the present inventive concept is not limited to this without fail. In another embodiment, the upper cover 300 may be hingedly coupled to the main body 100. In such a case, the hinge protrusion 210 and stopper protrusion 220 may be formed on the upper cover 300 or on the main body 100. The hinge hole 310 and the stopper hole 320 may be formed in the main body or the upper cover.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A fastening apparatus for a battery terminal case comprising:
    a main body having an open upper portion and an open side portion configured to hold a battery terminal therein;
    a side body coupled to the open side portion of the main body; and
    an upper cover, hingedly coupled to the side body, provided at the open upper portion of the main body,
    wherein hinge protrusions are formed on opposing sides of one of the side body and the upper cover, and hinge holes are formed on opposing sides of the other one of the side body and the upper cover, the hinge holes configured to receive the hinge protrusions therein,
    wherein each hinge protrusion has a stopper protrusion extending therefrom, and each hinge hole has a stopper hole configured to receive the stopper protrusion,
    wherein an angle adjusting rib is further formed on one of the upper cover and the side body, the angle adjusting rib configured to adjust, with the stopper protrusion, an opening angle of the upper cover,
    wherein one of the upper cover and the side body has recessed seating surfaces formed in opposing sides thereof, and
    wherein the hinge holes and the stopper holes are formed in the recessed seating surfaces.

2. The fastening apparatus of claim 1, further comprising a locking device configured to secure the upper cover to the main body.

3. The fastening apparatus of claim 1, wherein the locking device includes;
    a hook rotatably provided to one of the upper cover and the main body, and
    a hook protrusion formed on the other one of the main body and the upper cover configured to latch the hook.

4. A fastening apparatus for a battery terminal case comprising:
- a main body having an open upper portion and an open side portion configured to hold a battery terminal therein;
- a side body coupled to the open side portion of the main body; and
- an upper cover provided at the open upper portion of the main body and hingedly coupled to the main body,
- wherein hinge protrusions are formed on opposing sides of one of the main body and the upper cover and hinge holes are formed in opposing sides of the other one of the main body and the upper cover, the hinge holes configured to receive the hinge protrusions therein,
- wherein each hinge protrusion has a stopper protrusion extending therefrom, and each hinge hole has a stopper hole configured to receive the stopper protrusion,
- wherein an angle adjusting rib is formed on one of the upper cover and the main body, the angle adjusting rib configured to adjust, with the stopper protrusion, an opening angle of the upper cover,
- wherein one of the upper cover and the main body has recessed seating surfaces formed in opposing sides thereof,
- wherein the hinge holes and the stopper holes are formed in the recessed seating surfaces.

5. The fastening apparatus of claim 4, further comprising a locking device configured to secure the upper cover and to the side body.

6. The fastening apparatus of claim 5, wherein the locking device includes;
- a hook rotatably provided to one of the upper cover and the side body, and
- a hook protrusion formed on the other one of the side body and the upper cover configured to latch the hook.

* * * * *